2 Sheets—Sheet 1.

F. R. GLASCOCK.
Fertilizer-Distributer.

No. 227,762. Patented May 18, 1880.

Witnesses:

Inventor:
J. R. Glascock

2 Sheets—Sheet 2.

F. R. GLASCOCK.
Fertilizer-Distributer.

No. 227,762. Patented May 18, 1880.

Witnesses:
W. C. McArthur,
Columbus S. Choate.

Inventor:
F. R. Glascock,
per
T. H. Alexander & Elliott,
Attorneys.

UNITED STATES PATENT OFFICE.

FRANK R. GLASCOCK, OF HILLSBOROUGH, OHIO.

FERTILIZER-DISTRIBUTER.

SPECIFICATION forming part of Letters Patent No. 227,762, dated May 18, 1880.

Application filed November 8, 1879.

*To all whom it may concern:*

Be it known that I, FRANK R. GLASCOCK, of Hillsborough, in the county of Highland and State of Ohio, have invented certain new and useful Improvements in Fertilizer-Distributers; and I do hereby declare that the following is a full, clear, and exact description thereof, reference being had to the accompanying drawings, and to the letters of reference marked thereon, which form part of this specification.

My invention relates to the construction of a fertilizer-distributer; and it consists in certain peculiarities of construction, as will be hereinafter more fully set forth, and pointed out in the claim.

In order to enable others skilled in the art to which my invention appertains to make and use the same, I will now proceed to describe its construction and operation, referring to the annexed drawings, in which—

Figure 1:
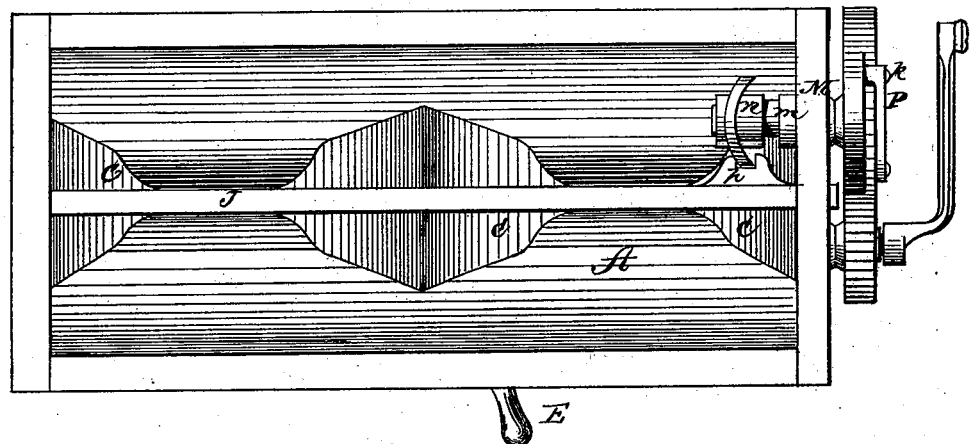
Figure 2:
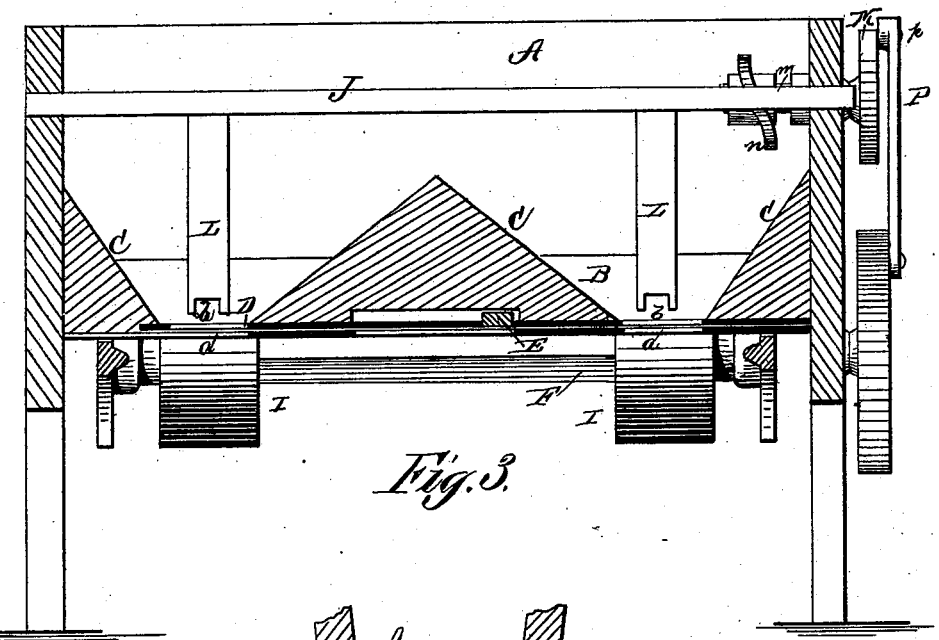
Figure 3:
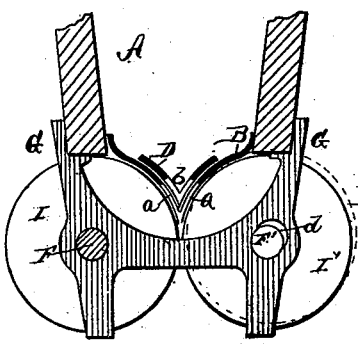
Figure 4:
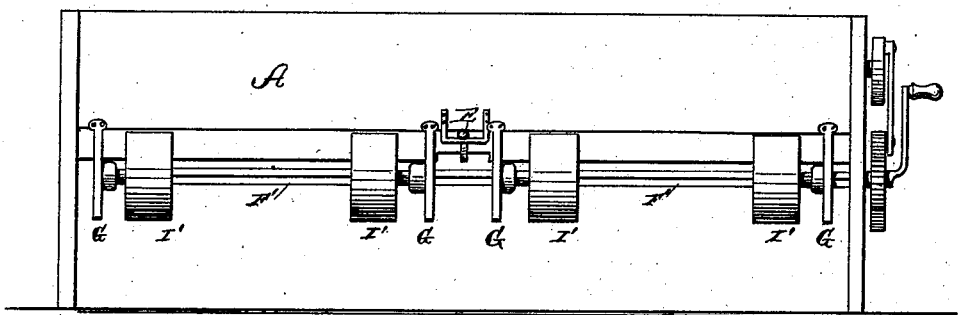
Figure 5:
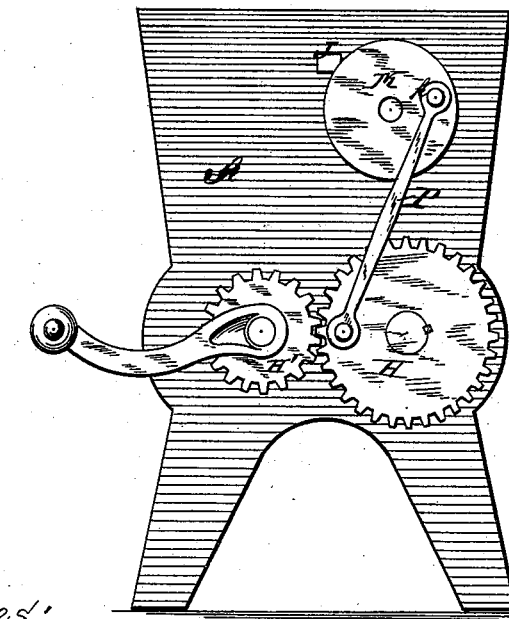

Figure 1 is a plan view; Fig. 2, a central longitudinal section; Fig. 3, a detail cross-section of the bottom of the hopper. Fig. 4 is a rear view, and Fig. 5 an end elevation.

A represents the hopper in which the fertilizer is placed for distribution. The bottom B of this hopper is made somewhat in V form in cross-section; but the sides of said bottom are curved convexly, as shown, and at suitable intervals this bottom is provided with openings *a a* for the exit of the fertilizer.

Between the openings *a*, as well as at each end of the box, are arranged division-blocks C C, made beveled, as shown, so as to form, as it were, a series of smaller hoppers, each having its sides inclining toward the opening *a*.

Under the division-blocks C is placed a slide, D, operated by means of a lever, E. This slide is made to fit the bottom B, and has openings *b* at suitable intervals, to register with the openings *a* in the bottom, the slide being used to regulate the size of the discharge-openings, and closing the same altogether when desired.

To the under side of the hopper or box A are attached hangers G G, in which two shafts, F and F', have their bearings. These shafts run parallel, and the shaft F should extend the entire length of the box, and are provided, respectively, opposite each side opening, *a*, with rubber rolls I and I'.

The shaft F is extended through one of the hangers G and through the support for the box at that end, and there provided with a gear-wheel, H, to receive its motion through any suitable mechanism from the driving-wheels of the machine.

The front shaft, F', has enlarged or elongated bearings in the hangers, as shown at *d*, which allows the rolls I' to fall back at an incline from the main rolls I. By this means it allows the feed to separate when the fertilizer is in the box and the feed is started, it being understood that each pair of rolls I I' come together directly at the corresponding discharge-opening *a*, and as the rolls rotate the fertilizer is fed downward by them.

When the motion is stopped the tendency of the rolls I' is to close up and keep the fertilizer from wasting.

Within the box A is a longitudinal bar, J, movable in slots in the end pieces of the box, and provided with arms or fingers L directly over the discharge-openings, to form an agitator for the fertilizer. This bar J is provided near one end with a slotted projection, *h*, in which works a worm, *n*, secured upon a short shaft, *m*, having its bearing in a box fastened in the end piece of the box. On the outer end of the shaft *m* is a disk, M, with a wrist-pin, *p*, connected by a pitman, P, with a similar wrist-pin fastened on the cog-wheel H. By this means the agitator obtains a longitudinally-reciprocating motion and stirs up the fertilizer.

I am well aware that the state of the art shows carding-machines to have been made with two rollers, one kept in contact with the other by gravity-bearings; also that elastic rolls have been used in seeding and fertilizing machines; but in these instances the rollers have been integral—that is to say, they have extended from side to side of the hopper—and not broken up into series of rollers, as in my invention.

Having thus fully described my invention, what I claim as new, and desire to secure by Letters Patent, is—

In a fertilizer-distributer, the combination of a series of rubber rolls secured upon a shaft having stationary bearings, and another series of rubber rolls secured upon a shaft having elongated bearings arranged on an incline, to allow said latter rolls to fall by gravity against the first series of rolls, substantially as and for the purposes herein set forth.

In testimony that I claim the foregoing as my own I affix my signature in presence of two witnesses.

FRANK R. GLASCOCK.

Witnesses:
 JOHN T. HIRE,
 CYRUS NEWBY.